United States Patent
Chang

(10) Patent No.: US 6,956,525 B1
(45) Date of Patent: Oct. 18, 2005

(54) METHOD FOR CORRECTING AZIMUTH ANGLE DATA OF A NAVIGATIONAL DEVICE AND THE NAVIGATIONAL DEVICE USED THEREIN

(75) Inventor: Apin Chang, Taipei Hsien (TW)

(73) Assignee: Wintecronics Co., Ltd., Taipei Hsien (TW)

( * ) Notice: Subject to any disclaimer, the term of this patent is extended or adjusted under 35 U.S.C. 154(b) by 0 days.

(21) Appl. No.: 10/989,256

(22) Filed: Nov. 16, 2004

(30) Foreign Application Priority Data

Sep. 20, 2004 (TW) .............................. 93128403 A

(51) Int. Cl.[7] .............................................. H04B 7/185
(52) U.S. Cl. ........................... 342/357.14; 342/357.06; 701/213
(58) Field of Search ...................... 342/357.01, 357.02, 342/357.06, 357.14; 701/208, 213, 216

(56) References Cited

U.S. PATENT DOCUMENTS 5,349,531 A * 9/1994 Sato et al. .................... 701/215
6,253,154 B1 * 6/2001 Oshizawa et al. ........... 701/221
6,784,840 B2 * 8/2004 Menegozzi et al. .......... 342/417

* cited by examiner

*Primary Examiner*—Dao Phan
(74) *Attorney, Agent, or Firm*—Darby & Darby

(57) ABSTRACT

A method for correcting azimuth angle data of a navigational device, which is installed in a vehicle, includes the steps of enabling the navigational device to periodically receive a position information signal that is transmitted from a global positioning system (GPS) service provider and that contains an azimuth angle of the vehicle, obtaining velocity data of the vehicle, obtaining magnetic north data by means of an electronic compass, and enabling the navigational device to correct the azimuth angle contained in the position information based on the magnetic north data when the velocity data is lower than a reference value. A navigational device that implements the aforesaid method is also disclosed.

7 Claims, 2 Drawing Sheets

METHOD FOR CORRECTING AZIMUTH ANGLE DATA OF A NAVIGATIONAL DEVICE AND THE NAVIGATIONAL DEVICE USED THEREIN

CROSS-REFERENCE TO RELATED APPLICATION

This application claims priority of Taiwanese application no. 093128403, filed on Sep. 20, 2004.

BACKGROUND OF THE INVENTION

1. Field of the Invention

The invention relates to a navigational device, more particularly to a method for correcting azimuth angle data of a navigational device.

2. Description of the Related Art

A conventional global positioning system (GPS) navigational device, which is installed in a vehicle, is operable so as to periodically receive a position information signal that is transmitted from a GPS service provider and that contains an azimuth angle of the vehicle.

The conventional GPS navigational device is disadvantageous in that, due to satellite movement, the azimuth angle contained in the position information signal received by the conventional navigational device is found to be inaccurate when the vehicle is stationary or moves at a relatively low speed.

SUMMARY OF THE INVENTION

Therefore, the main object of the present invention is to provide a method for correcting an azimuth angle data of a navigational device that is implemented using the navigational device in an attempt to overcome the aforesaid drawback of the prior art.

Another object is to provide a navigational device that implements the method of this invention.

According to one aspect of the present invention, a method for correcting azimuth angle data of a navigational device, which is installed in a vehicle, comprises the steps of:

(A) enabling the navigational device to periodically receive a position information signal that is transmitted from a global positioning system (GPS) service provider and that contains an azimuth angle of the vehicle;

(B) obtaining velocity data of the vehicle;

(C) obtaining magnetic north data by means of an electronic compass; and (D) enabling the navigational device to correct the azimuth angle contained in the position information signal received by the navigational device in step (A) based on the magnetic north data obtained in step (C) when the velocity data obtained in step (B) is lower than a reference value.

According to another aspect of the present invention, a navigational device, which is adapted to be installed in a vehicle, comprises an electronic compass and a GPS module. The electronic compass includes a sensor that detects a magnetic field, and a compass processor that is coupled to the sensor, and that is operable so as to generate magnetic north data corresponding to the magnetic field detected by the sensor. The GPS module includes a signal receiver and a GPS processor. The signal receiver is operable so as to periodically receive a position information signal that is transmitted from a global positioning system (GPS) service provider and that contains an azimuth angle of the vehicle. The GPS processor is coupled to the compass processor of the electronic compass and the signal receiver, and is operable so as to obtain velocity data of the vehicle, so as to receive the magnetic north data generated by the compass processor of the electronic compass, and so as to correct the azimuth angle contained in the position information signal received by the signal receiver based on the magnetic north data from the compass processor when the velocity data obtained by the GPS processor is lower than a reference value.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
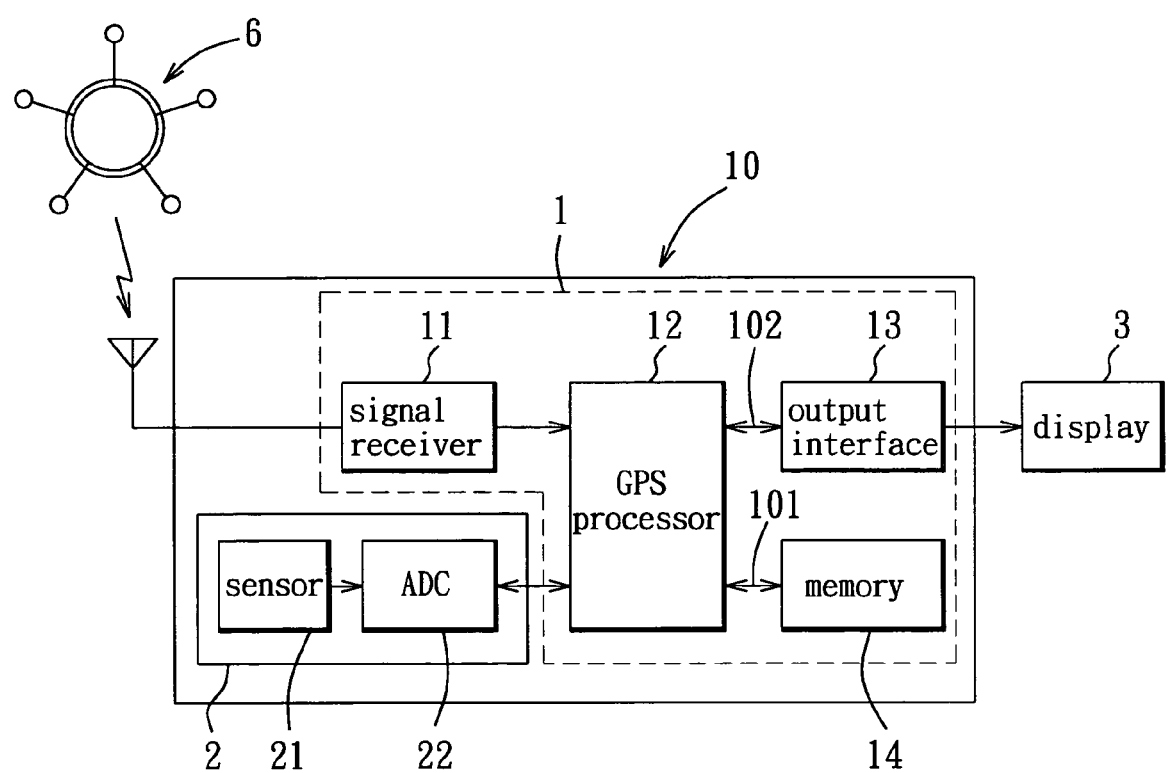
FIG. 1 is a schematic circuit block diagram of the preferred embodiment of a navigational device according to the present invention.

Referring to FIG. 1, the preferred embodiment of a navigational device 10 according to this invention is shown to include an electronic compass 2 and a global positioning system (GPS) module 1.

The navigational device 10 in this embodiment is installed in a vehicle (not shown).

The electronic compass 2 includes a sensor 21 and a compass processor. The sensor 21 detects a magnetic field. The compass processor includes an analog-to-digital converter (ADC) 22 that is coupled to the sensor 21 and that is operable so as to generate magnetic north data corresponding to the magnetic field detected by the sensor 21. Since the feature of the present invention does not reside in the specific configuration of the sensor 21 and the ADC 22 of the compass processor, which are conventional in construction, a detailed description of the same is omitted herein for the sake of brevity.

The GPS module 1 includes a signal receiver 11 and a GPS processor 12. The signal receiver 11 is operable in a conventional manner so as to periodically receive a position information signal that is transmitted from a GPS service provider 6 and that contains an azimuth angle of the vehicle. The GPS processor 12 is coupled to the ADC 22 of the compass processor of the electronic compass 2 and the signal receiver 11.

The GPS module 1 further includes a memory unit 14 and an output interface 13, each of which is coupled to the GPS processor 12. In this embodiment, the output interface 13 may be one of a RS-232, a universal serial bus (USB), a personal computer memory card international association (PCMCIA), a PS/2, and a bluetooth interface.

The GPS processor 12 is operable so as to obtain velocity data of the vehicle from the position information signal received by the signal receiver 11, so as to receive the magnetic north data generated by the ADC 22 of the compass processor of the electronic compass 2, and so as to correct the azimuth angle contained in the position information signal received by the signal receiver 11 based on the magnetic north data from the ADC 22 of the compass processor when the velocity data obtained by the GPS processor 12 is lower than a reference value, in a manner that will be described in detail hereinafter. It is noted that, in this embodiment, the reference value is 10 kilometers per hour.

It is noted that, due to electromagnetic field interference, such as that encountered when the vehicle is in the vicinity of high-voltage power stations, the ADC 22 of the compass process or may generate an inaccurate magnetic north data. Therefore, in this embodiment, the GPS processor 12 is further operable so as to correct the magnetic north data generated by the ADC 22 of the compass processor of the electronic compass 2 based on the azimuth angle contained in the position information signal received by the signal receiver 11 when the velocity data obtained by the GPS processor 12 is higher than the reference value, in a manner that will be described in detail hereinafter, thereby compensating for the effect of electromagnetic field interference.

Figure 2:
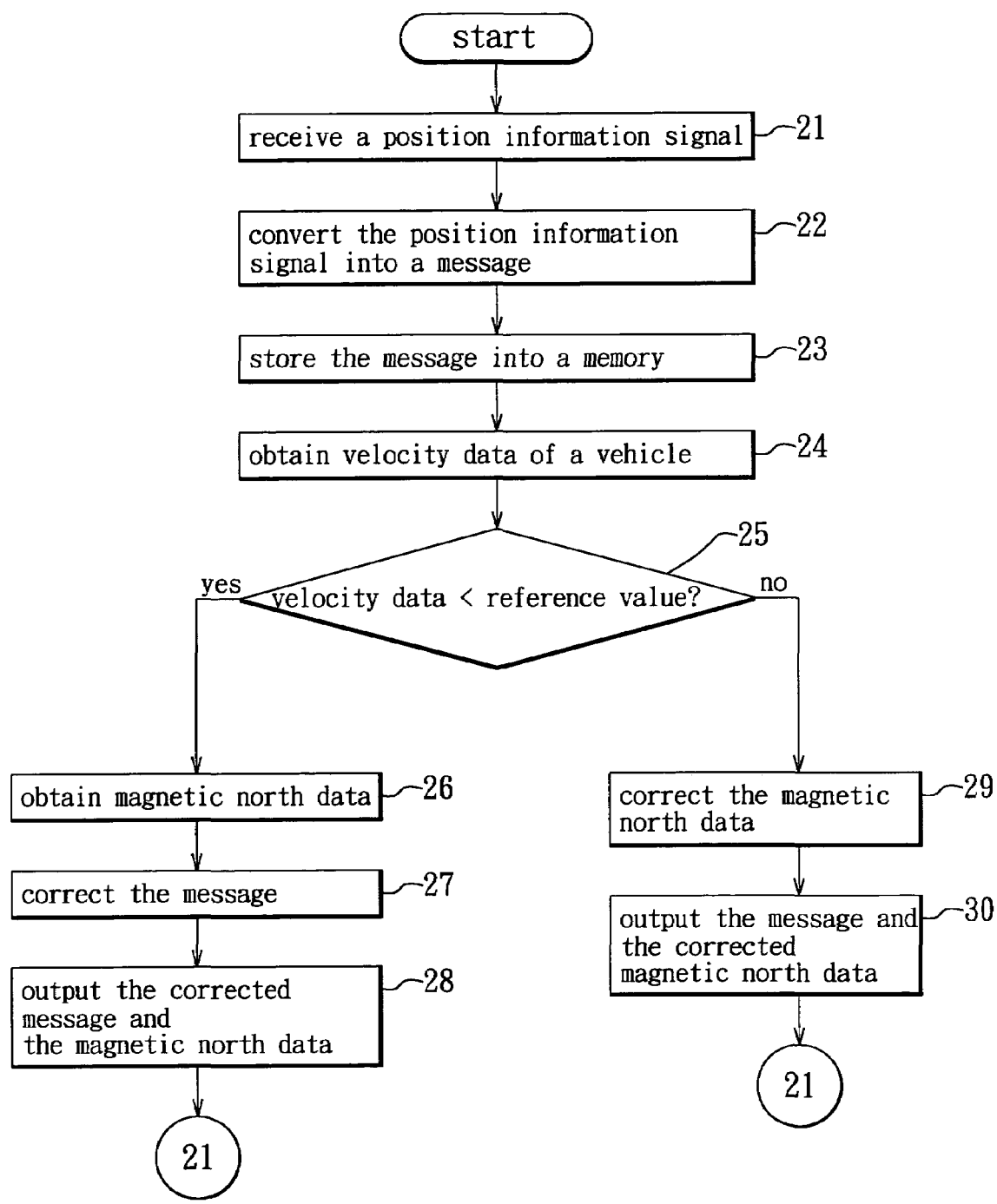
FIG. 2 is a flowchart of the preferred embodiment of a method for correcting azimuth angle of a navigational device according to the present invention.

The preferred embodiment of a method for correcting azimuth angle data of the navigational device 10, which is installed in a vehicle, according to this invention includes the steps shown in FIG. 2.

In step 21, the signal receiver 11 of the navigational device 10 periodically receives a position information signal transmitted from the GPS service provider 6.

In step 22, the GPS processor 12 of the GPS module 1 of the navigational device 10 converts the position information signal received in step 21 into a message that has a format conforming to a vector track and speed over ground (VTG) of a national marine electronics association (NMEA) protocol.

It is noted that in an alternative embodiment, the GPS processor 12 of the GPS module 1 of the navigational device 10 converts the position information signal received in step 21 into a message that has a format conforming to a recommended minimum specific GPS/transit data (RMC) of the NMEA.

In step 23, the GPS processor 12 of the GPS module 1 of the navigational device 10 stores the message in the memory unit 14.

In step 24, the GPS processor 12 of the GPS module 1 of the navigational device 10 obtains the velocity data of the vehicle contained in the message stored in the memory unit 14.

In step 25, the GPS processor 12 of the GPS module 1 of the navigational device 10 compares the velocity data obtained in step 24 with the reference value. When the velocity data obtained in step 24 is lower than the reference value, the flow proceeds to step 26. Otherwise the flow proceeds to step 29.

In step 26, the GPS processor 12 of the GPS module 1 of the navigational device 10 obtains the magnetic north data from the electronic compass 2.

In step 27, the GPS processor 12 of the GPS module 1 of the navigational device 1 corrects the azimuth angle contained in the message stored in the memory 14 based on the magnetic north data obtained in step 26. In this embodiment, correction is made based on the difference between the azimuth angle contained in the message and the magnetic north data.

In step 28, the GPS processor 12 of the GPS module 1 of the navigational device 10 provides an output conforming to the corrected message stored in the memory unit 14 and the magnetic north data of the electronic compass 2 to a display 3 through the output interface 13. Thereafter, the flow goes back to step 21.

In step 29, the GPS processor 12 of the GPS module 1 of the navigational device 10 corrects the magnetic north data of the electronic compass 2 based on the azimuth angle contained in the message stored in the memory unit 14.

In step 30, the GPS processor 12 of the GPS module 1 of the navigational device 10 provides an output conforming to the message and the corrected magnetic north data of the electronic compass 2 to the display 3 through the output interface 13. Thereafter, the flow goes back to step 21.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for correcting azimuth angle data of a navigational device that is installed in a vehicle, said method comprising the steps of:
   (A) enabling the navigational device to periodically receive a position information signal that is transmitted from a global positioning system (GPS) service provider and that contains an azimuth angle of the vehicle;
   (B) obtaining velocity data of the vehicle;
   (C) obtaining magnetic north data by means of an electronic compass; and
   (D) enabling the navigational device to correct the azimuth angle contained in the position information signal received by the navigational device in step (A) based on the magnetic north data obtained in step (C) when the velocity data obtained in step (B) is lower than a reference value.

2. The method as claimed in claim 1, wherein, in step (B), the velocity data is obtained from the position information signal received in step (A).

3. The method as claimed in claim 1, further comprising the step of:
   (E) enabling the navigational device to correct the magnetic north data of the electronic compass based on the azimuth angle contained in the position information signal received in step (A) when the velocity data obtained in step (B) is higher than the reference value.

4. A navigational device adapted to be installed in a vehicle, said navigational device comprising:
   an electronic compass including
      a sensor that detects a magnetic field, and
      a compass processor coupled to said sensor, and operable so as to generate magnetic north data corresponding to the magnetic field detected by said sensor; and
   a GPS module including
      a signal receiver operable so as to periodically receive a position information signal that is transmitted from a global positioning system (GPS) service provider and that contains an azimuth angle of the vehicle, and
      a GPS processor coupled to said compass processor of said electronic compass and said signal receiver, said GPS processor being operable so as to obtain velocity data of the vehicle, so as to receive the magnetic north data generated by said compass processor of said electronic compass, and so as to correct the azimuth angle contained in the position information signal received by said signal receiver based on the magnetic north data from said compass processor when the velocity data obtained by said GPS processor is lower than a reference value.

5. The navigational device as claimed in claim 4, wherein said GPS processor obtains the velocity data from the position information signal received by said signal receiver.

6. The navigational device as claimed in claim 4, wherein said GPS processor is further operable so as to correct the magnetic north data generated by said compass processor of said electronic compass based on the azimuth angle contained in the position information signal received by said signal receiver when the velocity data obtained by said GPS processor is higher than the reference value.

7. The navigational device as claimed in claim 4, wherein said GPS processor of said GPS module is further operable so as to convert the position information signal received by said signal receiver into a message that conforms to one of a recommended minimum specific GPS/transit data (RMC) and a vector track and speed over ground (VTG) of a national marine electronics association (NMEA) protocol.

* * * * *